(No Model.)
E. HUBER.
VEHICLE WHEEL.
No. 303,285. Patented Aug. 12, 1884.
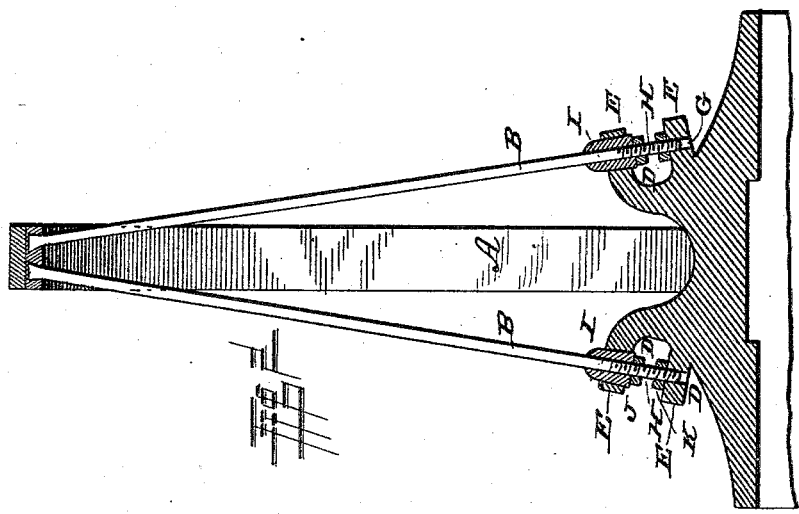
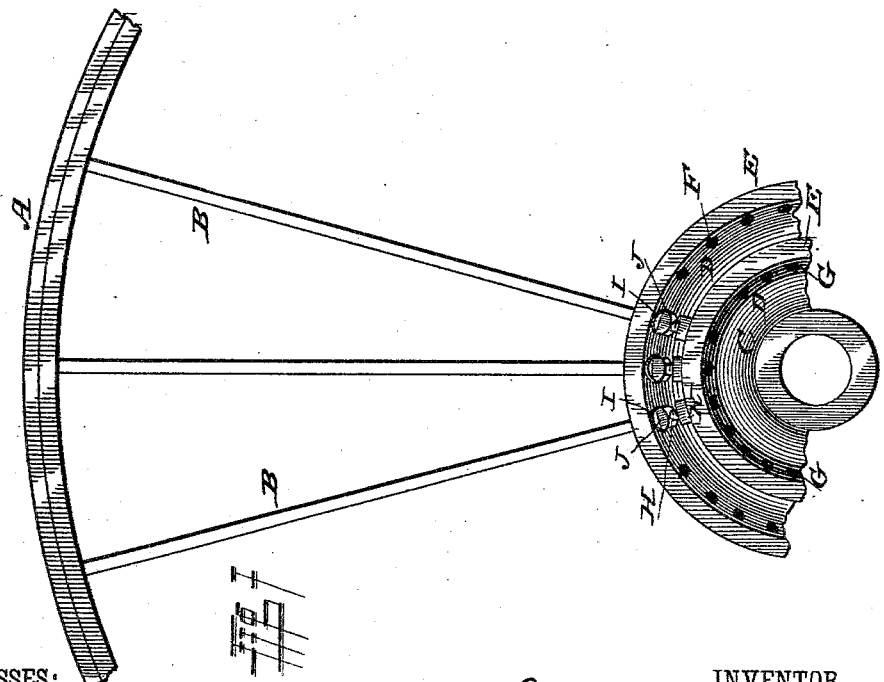
WITNESSES:
Fred. G. Dieterich.
INVENTOR,
Edward Huber
by Louis Bagger & Co.
ATTORNEYS.

UNITED STATES PATENT OFFICE.

EDWARD HUBER, OF MARION, OHIO.

VEHICLE-WHEEL.

SPECIFICATION forming part of Letters Patent No. 303,285, dated August 12, 1884.

Application filed May 8, 1884. (No model.)

*To all whom it may concern:*

Be it known that I, EDWARD HUBER, a citizen of the United States, and a resident of Marion, in the county of Marion and State of Ohio, have invented certain new and useful Improvements in Spoke-Fasteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a portion of a vehicle-wheel provided with my improved spoke-fastener, and Fig. 2 is a vertical section on line $x$ $x$.

Similar letters of reference indicate corresponding parts in both the figures.

My invention has relation to fastenings for spokes in metallic vehicle-wheels; and it consists in the improved construction and combination of parts of the same, as hereinafter more fully described and claimed.

In the accompanying drawings, the letter A indicates the tire of the wheel, B the spokes, and C the hub, which has upon its middle two annular projections, D, passing around the hub, the outer faces of which are provided with two outwardly-projecting concentric flanges, E, slightly inclined toward the middle of the hub. These flanges have a number of registering-perforations, F and G, the perforations F in the outer flange being tapering toward the outer side of the flange, and the inner ends of the spokes H, the outer ends of which are secured in the tire, pass through these perforations. Tapering blocks I, consisting of one, two, or more pieces, fit around the inner ends of the spokes fitting in the tapering perforations in the outer flange, and two nuts, J and K, turn upon the threaded end of each spoke, one nut bearing against the inner larger end of the tapering block, and the other nut bearing against the outwardly-facing side of the flange at the perforation in the same.

It will be seen that by screwing the outer nuts up against the tapering blocks the inner ends of the spokes are drawn inward, and the tapering blocks forced farther up in the tapering perforations, causing them to clamp the spokes more firmly, and the inner nuts, bearing against the inner flange, will resist inward strain upon the spokes, preventing them from being forced too far inward, as also by drawing either nut the tapered blocks will be more firmly crowded into the perforation and around the spoke, thus preventing the relaxing of the spoke from loosening the blocks.

Having thus described my invention, I claim and desire to secure by Letters Patent of the United States—

1. In a vehicle-wheel, the combination of the hub having the annular flange having tapering perforations, the spokes having screw-threaded inner ends passing through the perforations, the tapering blocks fitting around the ends of the spokes in the tapering perforations, and the nuts fitting upon the threaded ends of the spokes, as and for the purpose shown and set forth.

2. In a vehicle-wheel, the combination of the hub having the annular flanges having tapering perforations in the outer flange and plain perforations in the inner flange, the spokes having threaded inner ends passing through the perforations in the flanges, the tapering blocks fitting in the tapering perforations upon the spokes, and the nuts turning upon the threaded ends of the spokes between the flanges, as and for the purpose shown and set forth.

In testimony that I claim the foregoing as my own I have hereunto affixed my signature in presence of two witnesses.

EDWARD HUBER.

Witnesses:
   J. E. DAVIDS,
   O. J. JOHNSON.